United States Patent
Woo et al.

(10) Patent No.: US 10,598,973 B2
(45) Date of Patent: Mar. 24, 2020

(54) DISPLAY DEVICE

(71) Applicant: LG Display Co., Ltd., Seoul (KR)

(72) Inventors: Yongtaek Woo, Paju-si (KR); Hyoungje Cho, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/052,525

(22) Filed: Aug. 1, 2018

(65) Prior Publication Data

US 2019/0049773 A1    Feb. 14, 2019

(30) Foreign Application Priority Data

Aug. 10, 2017    (KR) .................. 10-2017-0101906

(51) Int. Cl.
  *G02F 1/1333*    (2006.01)
  *G09G 3/34*    (2006.01)
  *F21V 8/00*    (2006.01)

(52) U.S. Cl.
  CPC ......... *G02F 1/133308* (2013.01); *G09G 3/34* (2013.01); *G02B 6/0086* (2013.01); *G02F 2001/133317* (2013.01); *G02F 2001/133322* (2013.01)

(58) Field of Classification Search
  CPC ... G02F 1/133308; G02F 2001/133322; G02F 2001/133317; G09G 3/34; G02B 6/0086
  See application file for complete search history.

(56) References Cited

U.S. PATENT DOCUMENTS

| 9,013,651 B2 | 4/2015 | Jeon et al. |
| 9,086,526 B2 | 7/2015 | Ha et al. |
| 2012/0172481 A1 | 7/2012 | Ha et al. |
| 2013/0235302 A1* | 9/2013 | Jeon et al. ........ G02F 1/133606 349/64 |

FOREIGN PATENT DOCUMENTS

| KR | 10-2011-0051949 A | 5/2011 |
| KR | 10-2012-0077914 A | 7/2012 |
| KR | 10-2013-0101812 A | 9/2013 |
| KR | 10-2016-0001872 A | 1/2016 |

* cited by examiner

*Primary Examiner* — Phu Vu
(74) *Attorney, Agent, or Firm* — Fenwick & West LLP

(57) ABSTRACT

A display device includes a cover bottom, a guide panel, and a guide holder. The cover bottom includes a horizontal portion covering a back surface of a light guide plate and a vertical portion extended from the horizontal portion that covers a side of the light guide plate. The guide panel includes a liquid crystal display panel supporter disposed under a liquid crystal display panel and positioned on the same plane as an optical sheet in parallel with the optical sheet, and an extension that is extended from the liquid crystal display panel supporter that covers the vertical portion. The guide holder is disposed between the light guide plate and the vertical portion. The optical sheet includes a protrusion protruding toward the vertical portion. The guide holder includes a body, a stopper protruding from the body, and a first boss protruding from the body.

19 Claims, 9 Drawing Sheets

(a)

(b)

DISPLAY DEVICE

This application claims the priority benefit of Korean Patent Application No. 10-2017-0101906 filed on Aug. 10, 2017, which is incorporated herein by reference for all purposes as if fully set forth herein.

BACKGROUND

Field of the Invention

The present disclosure relates to a display device including a backlight unit.

Discussion of the Related Art

Liquid crystal displays have been applied to portable computers such as notebook PCs, office automation devices, audio/video devices, advertising display devices for indoor or outdoor uses, and so on. The liquid crystal display controls an electric field applied to a liquid crystal layer of a liquid crystal display panel and modulates light provided by a backlight unit, thereby displaying an image.

The backlight unit may be classified as an edge type backlight unit and a direct type backlight unit. The edge type backlight unit is configured such that light source(s) are positioned opposite a side of a light guide plate, and a plurality of optical sheets is positioned between the liquid crystal display panel and the light guide plate. In the edge type backlight unit, the light sources irradiate light onto one side of the light guide plate, and the light guide plate converts a line light source or a point light source into a surface light source and irradiates light onto the liquid crystal display panel. The direct type backlight unit is configured such that light sources are positioned under the liquid crystal display panel. The direct type backlight unit irradiates light diffused by a diffuser plate onto the liquid crystal display panel.

The liquid crystal display panel and the backlight unit are assembled with case members for fixing them to form a liquid crystal module. The case members may include a guide panel, a cover bottom, a case top, and the like. The liquid crystal module is accommodated in an inner space of a set component such as a rear cover and a middle frame and is implemented as a liquid crystal display.

Because a related art liquid crystal display includes many components as described above, it is difficult to design lightweight and thin (or slim) liquid crystal displays in a related art. Further, the related art liquid crystal displays have a difficulty in implementing various designs. As a result, it is difficult to apply the related art liquid crystal displays to various fields.

In addition, the optical sheets and the light guide plate accommodated in the case member may expand and contract or move (or change in position) due to external factors including temperature change, moisture change, external impact, vibration, etc. When the optical sheets and the light guide plate move, they may be damaged. Further, optical characteristics of the liquid crystal display may change. This may lead to poor image quality and a reduction in product reliability of the liquid crystal display.

SUMMARY

The present disclosure provides a display device capable of achieving a thin profile even while including a component for preventing a movement of optical sheets and a light guide plate.

In one aspect, there is provided a display device including a liquid crystal display panel, an optical sheet under the liquid crystal display panel, and a light guide plate under the optical sheet, comprising a cover bottom including a horizontal portion covering a back surface of the light guide plate and a vertical portion that is extended from the horizontal portion and covers a side of the light guide plate, a guide panel including a liquid crystal display panel supporter, the liquid crystal display panel supporter is disposed under the liquid crystal display panel and is positioned on a same plane as the optical sheet in parallel with the optical sheet, and an extension that is extended from the liquid crystal display panel supporter and covers the vertical portion, and a guide holder disposed between the light guide plate and the vertical portion of the cover bottom, wherein the optical sheet includes a protrusion protruding toward the vertical portion of the cover bottom, wherein the guide holder includes a body, a stopper that protrudes from the body toward the liquid crystal display panel and covers a side of the protrusion of the optical sheet, and a first boss protruding from the body toward the vertical portion of the cover bottom, wherein the vertical portion of the cover bottom includes a first groove into which the first boss of the guide holder is inserted.

The display device further comprises an adhesive layer disposed under an edge of the liquid crystal display panel and directly contacting the liquid crystal display panel supporter of the guide panel, the protrusion of the optical sheet, and the stopper of the guide holder.

The guide holder further includes a second boss protruding from the body of the guide holder and disposed between the light guide plate and the horizontal portion of the cover bottom.

The optical sheet includes a convex portion, in which the protrusion is positioned, and a concave portion positioned adjacent to the convex portion. The stopper of the guide holder covers at least one of a first side of the concave portion and a second side of the convex portion and a third side connecting the first side and the second side.

A thickness of the stopper of the guide holder is greater than a thickness of the optical sheet.

The first groove of the cover bottom has a hole shape passing through an entire thickness of the vertical portion of the cover bottom, or a groove shape in which a thickness of the vertical portion of the cover bottom is partially depressed.

One side of the first groove is opened.

The vertical portion of the cover bottom includes a hook protruding toward the extension of the guide panel. The extension of the guide panel includes a second groove formed as a depressed portion of an inner surface of the extension, and the hook is inserted into the second groove. The liquid crystal display panel supporter of the guide panel includes a third groove formed as a depressed portion of an inner surface of the liquid crystal display panel supporter, and one end of the vertical portion of the cover bottom is inserted into the third groove.

The display device further comprises a tape including one end attached to an upper surface of the protrusion and the other end attached to an outer surface of the cover bottom.

In one aspect, there is provided a display device including a liquid crystal display panel, an optical sheet under the liquid crystal display panel, a light guide plate under the optical sheet, a cover bottom covering a bottom surface of the light guide plate and at least a portion of a side surface of the light guide plate, a guide panel covering a side surface of the light guide plate and including a liquid crystal panel supporter to support at least an edge of the liquid crystal display panel, a guide holder including a body, a boss protruding from the body extending beneath a portion of the light guide plate, and a stopper protruding from the body toward the liquid crystal display panel and covering at least a portion of a side surface of the optical sheet to guide a position of the optical sheet, wherein the guide holder is at least partially enclosed by the cover bottom and the guide panel, and an adhesive layer attached to the liquid crystal display panel, the optical sheet, the guide panel, and the guide holder. A top surface of the adhesive layer contacts a portion of a bottom surface of the liquid crystal display panel. A bottom surface of the adhesive layer contacts at least a portion of top surfaces of the optical sheet, the liquid crystal panel supporter of the guide panel, and the stopper of the guide holder.

In one aspect, the optical sheet may include a protrusion. The optical sheet includes a convex portion in which the protrusion is positioned and a concave portion positioned adjacent to the convex portion. A side of the concave portion is a first side, a side of the convex portion is a second side, a side connecting the first side and the second side is a third side. The stopper of the guide holder may cover a portion of the first side and a portion of the third side. The stopper of the guide holder may cover a portion of the second side and a portion of the third side. The stopper of the guide holder may cover an entire side of the protrusion including a side of the convex portion of the protrusion and two sides of the optical sheet adjacent to the side of the convex portion of the protrusion determining a shape of the protrusion. The stopper of the guide holder may be in same plane as and in parallel with the liquid crystal panel display supporter of the guide panel.

The cover bottom may include a hook, and the guide panel may include a groove. The cover bottom may be fastened to the guide panel by inserting the hook of the cover bottom into the groove of the guide panel.

The liquid crystal display panel supporter may include a projection protruding from an end of the liquid crystal display panel supporter towards the liquid display panel.

The guide holder may include another boss protruding from a body of the guide holder to fit in a groove of the cover bottom. One side of the groove of the cover bottom may be opened.

The display device may include a tape including one end attached to at least a portion of the optical sheet and another end attached to at least a portion of an outer surface of the cover bottom.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION OF THE EMBODIMENTS

Reference will now be made in detail to embodiments of the disclosure, examples of which are illustrated in the accompanying drawings. Wherever possible, the same reference numbers will be used throughout the drawings to refer to the same or like parts. Detailed descriptions of known arts will be omitted if such may mislead the embodiments of the disclosure. In the following embodiments, the same components are described in a first embodiment and may be omitted in the other embodiments.

The terms "first", "second", etc. may be used to describe various components, but the components are not limited by such terms. The terms are used only for the purpose of distinguishing one component from other components. For example, a first component may be designated as a second component, and vice versa, without departing from the scope of the present disclosure.

Figure 1:
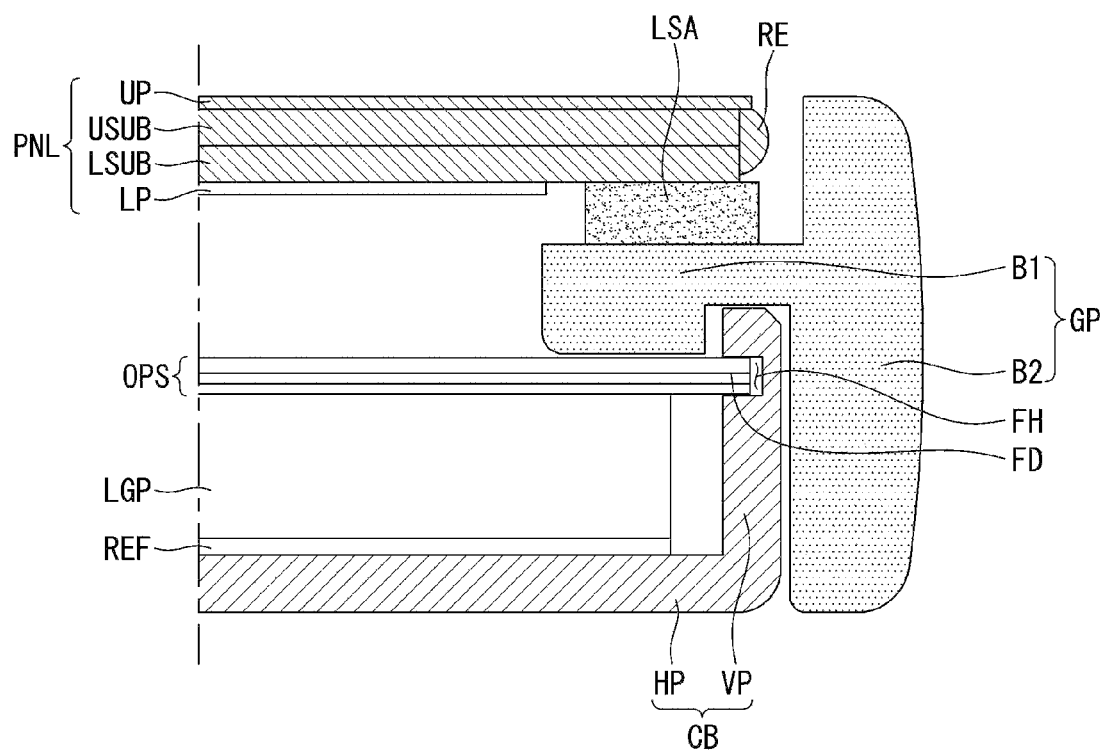
FIG. 1 is a schematic cross-sectional view of a liquid crystal display according to an embodiment of the disclosure.

FIG. 1 is a schematic cross-sectional view of a liquid crystal display according to an embodiment of the disclosure.

Referring to FIG. 1, a liquid crystal display according to an embodiment of the disclosure includes a liquid crystal display panel PNL and a backlight unit disposed under the liquid crystal display panel PNL. The liquid crystal display panel PNL includes an upper substrate USUB, a lower substrate LSUB, and a liquid crystal layer between the upper substrate USUB and the lower substrate LSUB. The liquid crystal layer may be implemented in at least one of various liquid crystal modes.

Polarizing films UP and LP may be provided on a front surface and/or a back surface of the liquid crystal display panel PNL. The polarizing films UP and LP are provided on at least one of the front surface and the back surface of the liquid crystal display panel PNL to pass only components of a specific direction among components of light provided by the backlight unit.

The liquid crystal display according to the embodiment of the disclosure may further include a sealing material RE covering the sides of the lower substrate LSUB and the upper substrate USUB that are disposed opposite each other, so as to protect the sides of the lower substrate LSUB and the upper substrate USUB and prevent a light leakage. The sealing material RE may be formed of a sealing resin including an oligomer, a monomer, a photoinitiator, additives, and the like. However, embodiments are not limited thereto.

The backlight unit is disposed under the liquid crystal display panel PNL and irradiates light onto the back surface of the liquid crystal display panel PNL. The backlight unit includes a light source, a light guide plate LGP, and at least one optical sheet OPS. Light, that is incident on a light incident surface of the light guide plate LGP from the light source, is converted into light of a surface light source and is emitted to a front surface of the light guide plate LGP. The light emitted to the light guide plate LGP is uniformly irradiated onto the back surface of the liquid crystal display panel PNL while passing through the optical sheet unit OPS positioned on the light guide plate LGP.

The light source may include one or more of lamps such as a light emitting diode (LED), a cold cathode fluorescent lamp (CCFL), and an external electrode fluorescent lamp (EEFL). The light source is positioned opposite at least one side (or the light incident surface) of the light guide plate LGP and irradiate light onto the side of the light guide plate LGP. The light guide plate LGP is a plate formed of transparent plastic, for example, polymethyl methacrylate (PMMA). The light guide plate LGP functions to convert light of a line light source or a point light source into light of a surface light source.

The optical sheet OPS includes one or more prism sheets and one or more diffuser sheets. The optical sheet OPS diffuses light incident from the light guide plate LGP and refracts a travel path of light at an angle substantially perpendicular to a light incident surface of the liquid crystal display panel PNL.

A reflective sheet REF is provided under the light guide plate LGP and increases efficiency of light incident on the liquid crystal display panel PNL by reflecting light provided from the light guide plate LGP. The reflective sheet REF may be attached to a cover bottom CB.

The liquid crystal display panel PNL and the backlight unit are assembled together by a case member such as the cover bottom CB and a guide panel GP to form a liquid crystal module.

The cover bottom CB may be formed in an "L" shape of a cross section which has at least one bend. The cover bottom CB includes a horizontal portion HP and a vertical portion VP. The horizontal portion HP is disposed to face a back surface of the backlight unit and cover the back surface of the backlight unit. The vertical portion VP is extended from the horizontal portion HP, is disposed opposite the side of the backlight unit, and covers the side of the backlight unit. The vertical portion VP is extended from one end of the horizontal portion HP in a frontward direction. Namely, the vertical portion VP has a shape protruding from the horizontal portion HP in the frontward direction. The backlight unit including the light source, the light guide plate LGP, at least one optical sheet OPS, etc. is accommodated in an inner space provided by the horizontal portion HP and the vertical portion VP.

The cover bottom CB may include a material having high thermal conductivity and high rigidity so as to smoothly dissipate heat from a driving circuit and the light source to the outside. For example, the cover bottom CB may be made of a metal material such as aluminum, aluminum nitride (AlN), electrolytic galvanized iron (EGI), stainless steel (SUS), galvalume steel coil (SGLC), aluminum coated steel (ALCOSTA), and steel plated tin (SPTE). Further, a high conductive material for accelerating the heat transfer may be coated on the metal material.

The guide panel GP may be formed in a " ⌐ " shape of a cross section which has at least one bend. This shape, broadly stated, could be considered an inverted and backward "L" shape. The guide panel GP includes a liquid crystal display panel supporter B1 and an extension B2. The liquid crystal display panel supporter B1 is provided between the liquid crystal display panel PNL and the backlight unit and supports an edge of the liquid crystal display panel PNL at a lower part of the liquid crystal display panel PNL. The liquid crystal display panel supporter B1 is provided between the liquid crystal display panel PNL and the optical sheet OPS and uniformly maintains a distance between the liquid crystal display panel PNL and the optical sheet OPS. The extension B2 is extended from the liquid crystal display panel supporter B1 and covers the vertical portion VP of the cover bottom CB at the outside of the cover bottom CB. The extension B2 is extended from one end of the liquid crystal display panel supporter B1 in a rearward direction.

The guide panel GP may have a rectangular frame shape with its center open. The guide panel GP may be made of a plastic material that can be molded into a mold, for example, polycarbonate. The guide panel GP and the cover bottom CB may be fixed to each other using a fastening means such as a hook.

The optical sheets OPS and the light guide plate LGP accommodated in the case member may expand and contract or move (or change in position) due to external factors including temperature change, moisture change, external impact, vibration, etc. When the optical sheets OPS and the light guide plate LGP move, they may be damaged by interference between them and other components. Further, optical characteristics of the liquid crystal display may change. A method for disposing the liquid crystal display panel supporter B1 of the guide panel GP on the optical sheets OPS and pressurizing the optical sheets OPS using the liquid crystal display panel supporter B1 may be considered to restrict and/or restrain a movement of the optical sheets OPS and the light guide plate LGP. However, in this instance, the method has limitations in restricting and/or restraining the movement of the light guide plate LGP and the remaining optical sheets OPS except the uppermost optical sheet OPS, that is disposed on an uppermost side and directly contacts the liquid crystal display panel supporter B1. When a considerable pressure is applied to the optical sheets OPS and the light guide plate LGP in consideration of the limitations, they may be damaged by the considerable pressure. In addition, because the liquid crystal display panel supporter B1 of the guide panel GP is disposed on the optical sheets OPS, the method has limitations in achieving a thin profile of the liquid crystal display.

Another method may be considered to restrict and/or restrain the movement of the optical sheets OPS and the light guide plate LGP. In the method, a fixing hole (or a fixing groove) FH may be formed in the cover bottom CB, and one end of each of the optical sheets OPS may be extended and inserted into the fixing hole FH of the cover bottom CB. Alternatively, a fixing protuberance FD may be formed at one end of each of the optical sheets OPS and may be inserted into the fixing hole FH of the cover bottom CB. The method has an advantage of restricting the movement of the optical sheets OPS. However, because the liquid crystal display panel supporter B1 for securing and maintaining an optical gap between the liquid crystal display panel PNL and the optical sheets OPS is disposed on the optical sheets OPS, the method has limitations in achieving the thin profile of the liquid crystal display.

An application field of liquid crystal displays has recently expanded to televisions, car displays, wearable devices, etc. as well as mobile devices such as smart phones and tablet PCs. In order to easily apply the liquid crystal displays to the above-described various fields, a thin profile of the liquid crystal displays is needed. Thus, a method is necessary to provide a liquid crystal display of a thin profile even while having a structure capable of restricting and restraining the movement of the optical sheets OPS and the light guide plate LGP for the purpose of preventing a reduction in optical characteristics of the liquid crystal display.

First Embodiment

Figure 2:
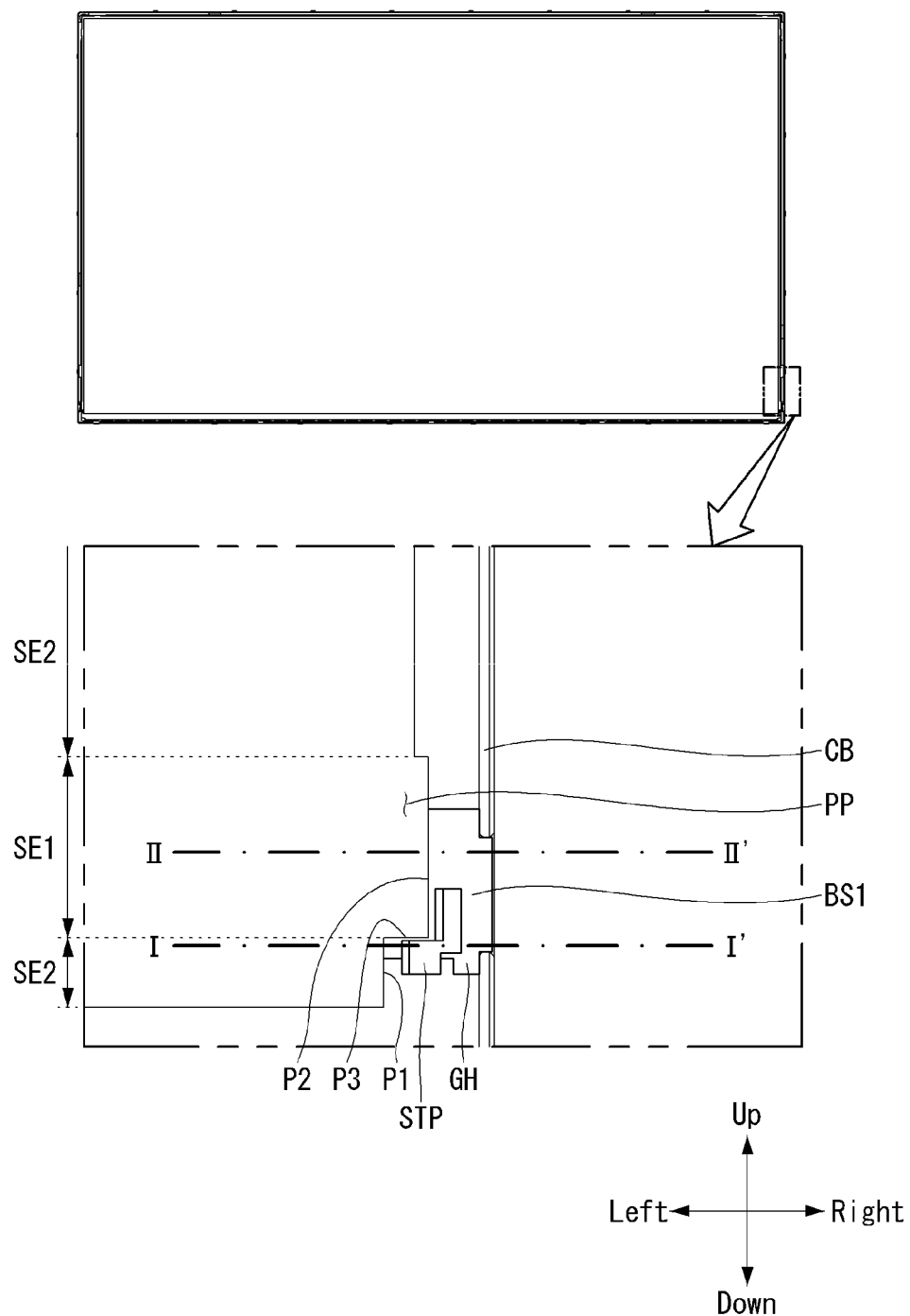
FIG. 2 illustrates a fastening relationship and a position relationship of optical sheets, a guide holder, a cover bottom, and a guide panel in a liquid crystal display according to a first embodiment of the disclosure.
Figure 3:
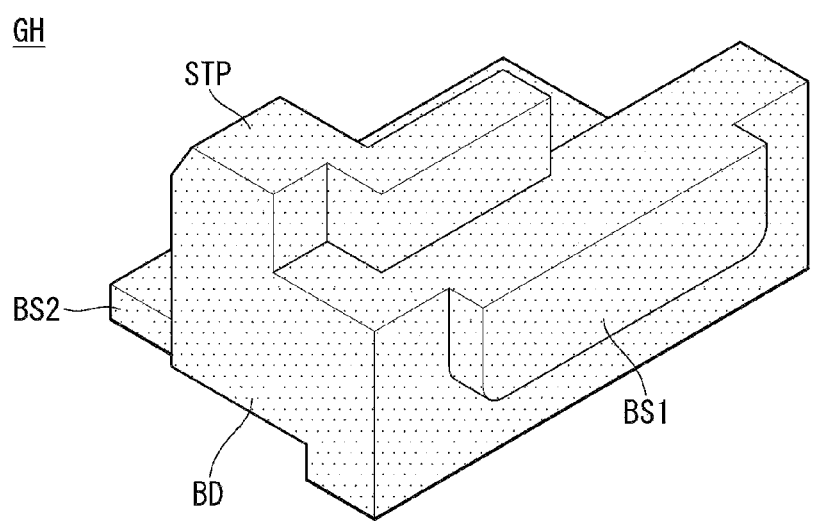
FIGS. 3 and 4 are perspective views illustrating configuration and a position relationship of a guide holder.
Figure 4:
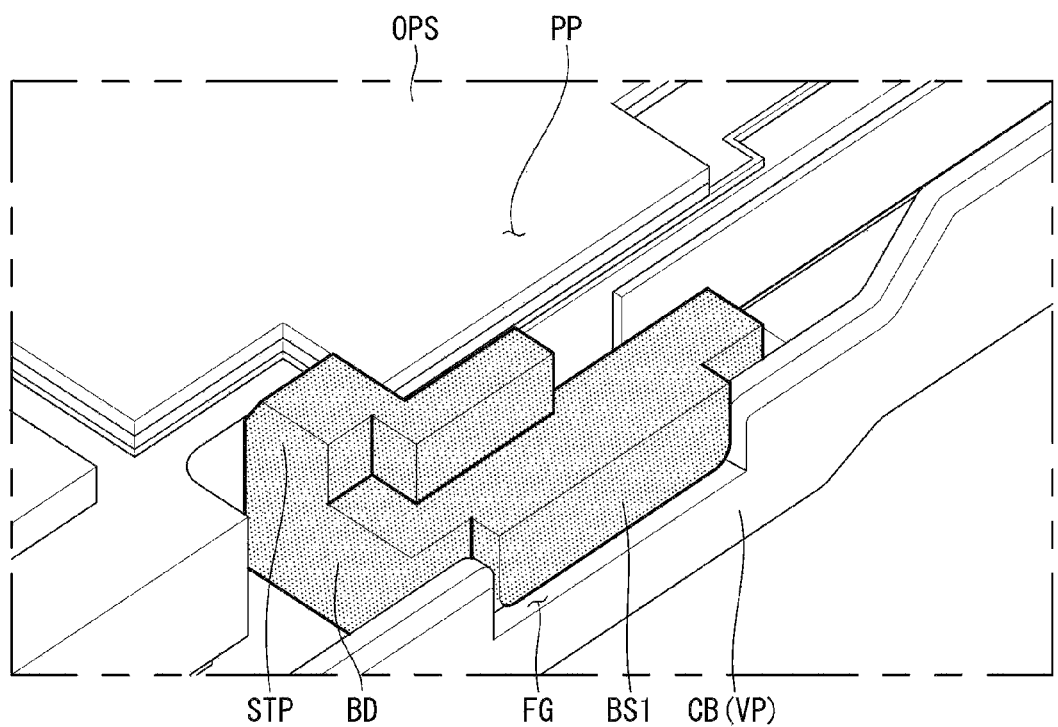
Figure 5:
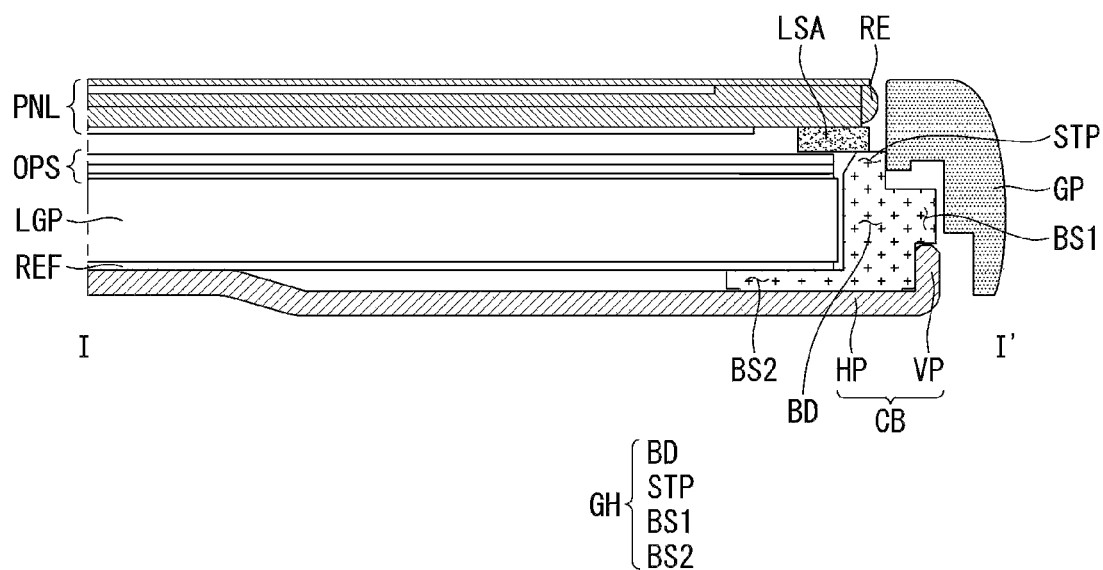
FIG. 5 is a cross-sectional view taken along line I-I' of FIG. 2.
Figure 6:
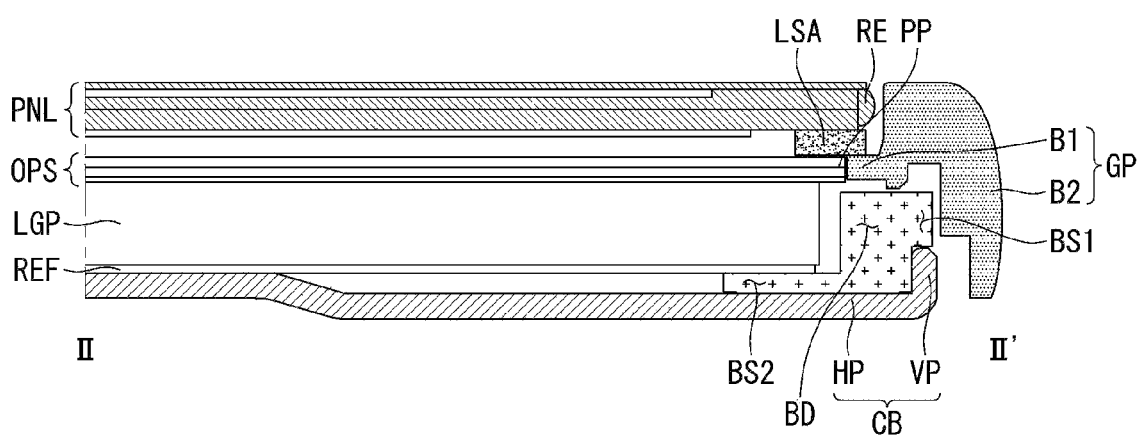
FIG. 6 is a cross-sectional view taken along line II-II' of FIG. 2.
Figure 7:
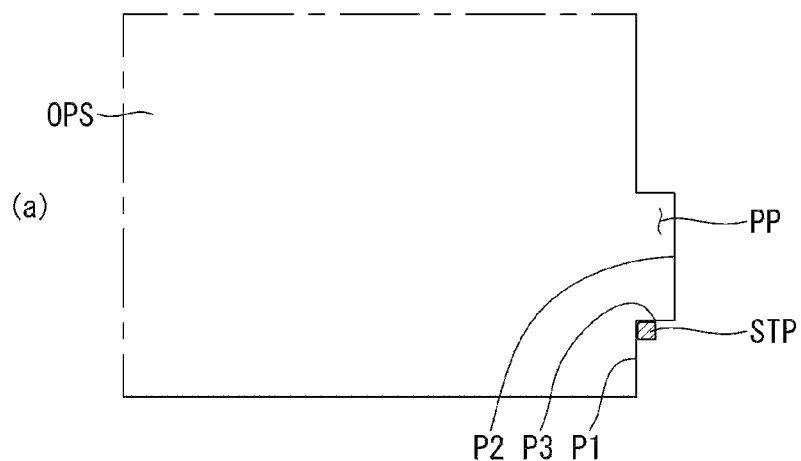
FIGS. 7 and 8 are plan views illustrating examples of disposing a guide holder.
Figure 7:
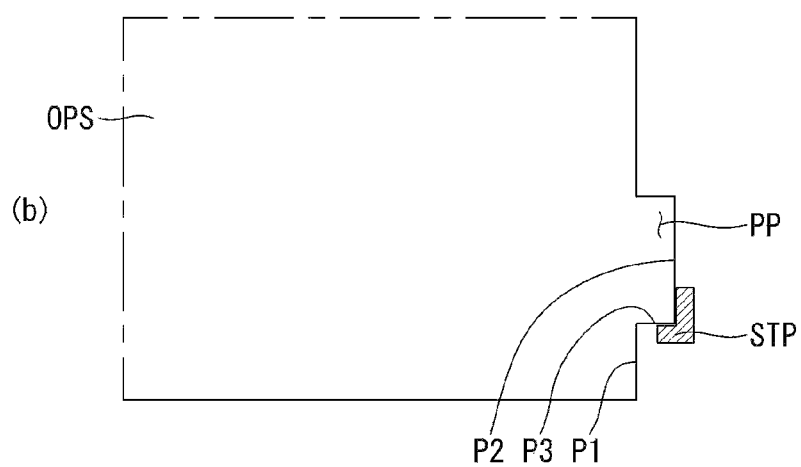
Figure 7:
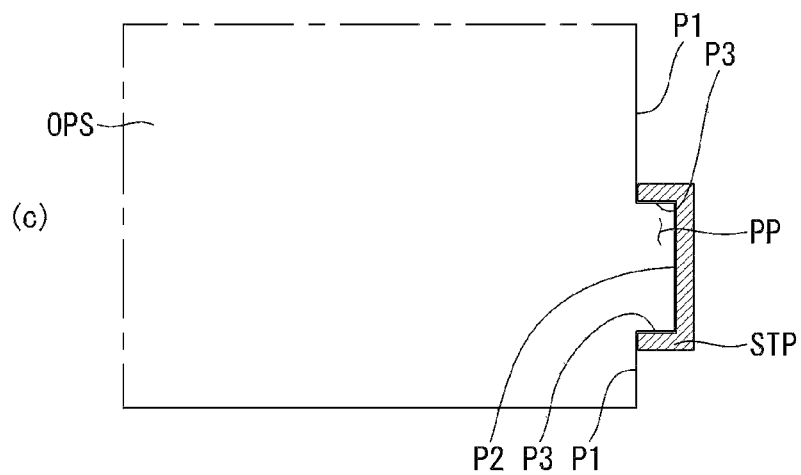
Figure 8:
Figure 8:
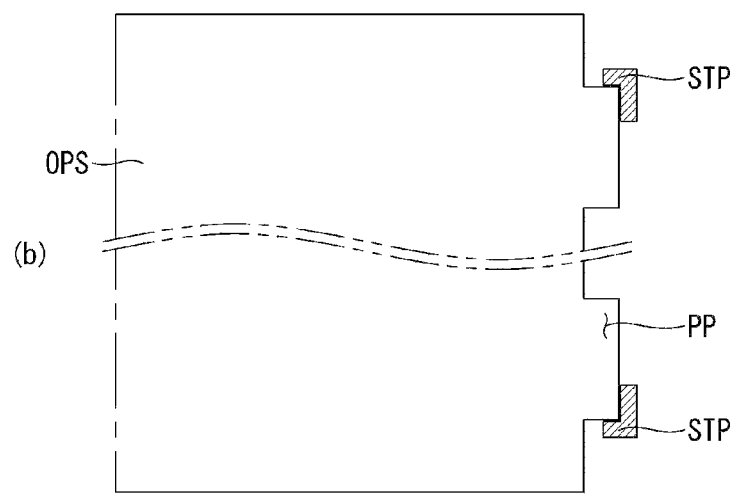
Figure 8:
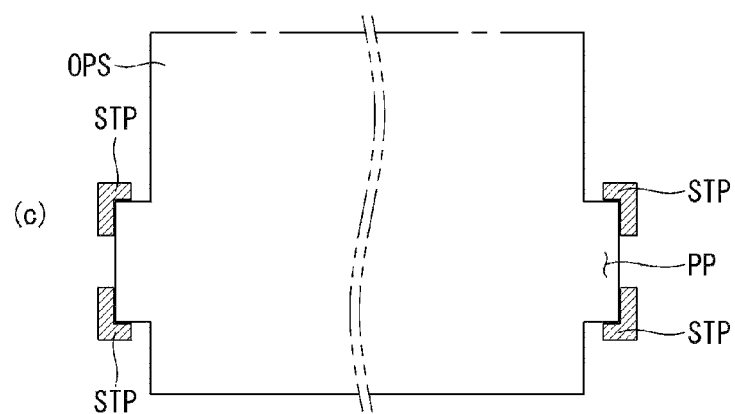

FIG. 2 illustrates a fastening relationship and a position relationship of optical sheets, a guide holder, a cover bottom, and a guide panel in a liquid crystal display according to a first embodiment of the disclosure. The close up view in FIG. 2 may not show some components of the liquid crystal display for clarity. However, these components may be shown in the cross sectional view of FIGS. 5 and 6 for clarity. FIGS. 3 and 4 are perspective views illustrating configuration and a position relationship of a guide holder. FIG. 5 is a cross-sectional view taken along line I-I' of FIG. 2. FIG. 6 is a cross-sectional view taken along line II-II' of FIG. 2. FIGS. 7 and 8 are plan views illustrating examples of disposing a guide holder.

Referring to FIGS. 2 to 7, a liquid crystal display according to a first embodiment of the disclosure includes a liquid crystal display panel PNL and a backlight unit disposed under the liquid crystal display panel PNL. The liquid crystal display panel PNL and the backlight unit are assembled together by a case member such as a cover bottom CB and a guide panel GP and a fixing member such as a guide holder GH to form a liquid crystal module. As shown in FIGS. 5 and 6, the guide holder GH may be at least partially enclosed by the guide panel GP and the cover bottom CB.

The cover bottom CB may be formed in an "L" shape of a cross section which has at least one bend. The cover bottom CB includes a horizontal portion HP and a vertical portion VP. The horizontal portion HP is disposed to face a back surface of the backlight unit and cover the back surface of the backlight unit. The vertical portion VP is extended from the horizontal portion HP, is disposed opposite the side of the backlight unit, and covers the side of the backlight unit. The vertical portion VP is extended from one end of the horizontal portion HP in a frontward direction. Namely, the vertical portion VP has a shape protruding from the horizontal portion HP in the frontward direction. The backlight unit including a light source, a light guide plate LGP, at least one optical sheet OPS, etc. and at least one guide holder GH restricting and/or restraining a movement of the components included in the backlight unit are accommodated in an inner space provided by the horizontal portion HP and the vertical portion VP.

The guide panel GP may be formed in a "㄀" shape of a cross section which has at least one bend. This shape, broadly stated, could be considered an inverted and backward "L" shape. The guide panel GP includes a liquid crystal display panel supporter B1 and an extension B2. The liquid crystal display panel supporter B1 supports an edge of the liquid crystal display panel PNL at a lower part of the liquid crystal display panel PNL. The liquid crystal display panel supporter B1 is provided between the liquid crystal display panel PNL and the guide holder GH and uniformly maintains a distance between the liquid crystal display panel PNL and the optical sheet OPS. The side of the liquid crystal display panel supporter B1 may be disposed opposite the side of the optical sheet OPS, and a back surface of the liquid crystal display panel supporter B1 may be disposed opposite a front surface of the guide holder GH. The liquid crystal display panel supporter B1 directly contacts the guide holder GH and can be supported by the guide holder GH.

The extension B2 is extended from the liquid crystal display panel supporter B1 and covers the vertical portion VP of the cover bottom CB at the outside of the cover bottom CB. The extension B2 is extended from one end of the liquid crystal display panel supporter B1 in a rearward direction. Because the extension B2 is configured as an appearance component unlike the liquid crystal display panel supporter B1 and is exposed to the outside, the extension B2 has to secure sufficient rigidity and prevent or reduce a reduction in the quality of an appearance resulting from defects in a manufacturing process. To this end, the extension B2 as the appearance component may have a thickness greater than the liquid crystal display panel supporter B1.

When the liquid crystal display panel supporter B1 of the guide panel GP is disposed on the optical sheet OPS as described above, in order to maintain an optical gap between the liquid crystal display panel PNL and the optical sheet OPS and restrict a movement of the optical sheet OPS, there is a limit of achieving a thin profile of the liquid crystal display due to a thickness of the liquid crystal display panel supporter B1. On the other hand, in the embodiment of the disclosure, the liquid crystal display panel supporter B1 is not disposed on the optical sheet OPS and is disposed on the same plane as the optical sheet OPS in parallel with the optical sheet OPS. In other words, the liquid crystal display panel supporter B1 does not overlap the optical sheet OPS in a vertical direction (or a thickness direction). Hence, embodiments of the disclosure can provide a thin profile liquid crystal display by minimizing a total thickness of the liquid crystal display and can easily apply the thin profile liquid crystal display to devices of various fields.

The guide holder GH includes a body BD, a first boss BS1, and a stopper STP. The guide hole GH may be made of a material with elasticity, for example, silicon, a rubber, etc. However, embodiments are not limited thereto. The body BD, the first boss BS1, and the stopper STP may be formed as one body.

The body BD is interposed between the vertical portion VP of the cover bottom CB and the side of the light guide plate LGP and may serve as a fixing member for restricting a movement of the light guide plate LGP. The body BD may also serve as a buffer member between other components.

The first boss BS1 is provided on a first surface of the body BD. The first surface of the body BD indicates a surface facing the vertical portion VP of the cover bottom CB. The first boss BS1 protrudes from the first surface of the body BD toward the vertical portion VP of the cover bottom CB. The vertical portion VP of the cover bottom CB includes a first groove FG at a location corresponding to the first boss BS1. The first groove FG may have a hole shape passing through an entire thickness of the vertical portion VP. Alternatively, the first groove FG may have a groove shape in which a thickness of the vertical portion VP is partially depressed.

The first boss BS1 is inserted into the first groove FG and a movement of the first boss BS1 is restricted. Namely, a movement of the guide holder GH is restricted by a fastening structure between the first boss BS1 and the first groove FG. Because the first boss BS1 has predetermined elasticity, the first boss BS1 of a compressed state may be inserted into the first groove FG. The first boss BS1 can be insertion-coupled to the first groove FG.

One side of the first groove FG may be opened so that the first boss BS1 and the first groove FG are easily fastened. Namely, an upper side of the first groove FG may be opened in a frontward direction, and the first boss BS1 may slide in a rearward direction and may be easily inserted into the opened upper side of the first groove FG. In this instance, a movement of the first boss BS1 in a horizontal direction and a movement of the first boss BS1 in the rearward direction can be restricted by the first groove FG, and a movement of the first boss BS1 in the frontward direction can be restricted by the liquid crystal display panel supporter B1 of the guide panel GP.

The stopper STP is provided on a second surface of the body BD. The second surface of the body BD indicates a surface facing the liquid crystal display panel supporter B1 of the guide panel GP. The second surface of the body BD may directly contact a back surface of the liquid crystal display panel supporter B1. Thus, a movement of the guide holder GH in an upward direction can be restricted. The stopper STP protrudes from the second surface of the body BD toward the liquid crystal display panel PNL. The stopper STP restrains and/or restricts the movement of the optical sheet OPS.

More specifically, the optical sheet OPS includes a protrusion PP. At least one end of the optical sheet OPS has an uneven structure due to the protrusion PP. Namely, one end of the optical sheet OPS may include a convex portion SE1, in which the protrusion PP is positioned, and a concave portion SE2 positioned adjacent to the convex portion SE1. A side of the concave portion SE2 may be defined as a first side P1, and a side of the convex portion SE1 may be defined as a second side P2. A side connecting the first side P1 and the second side P2 may be defined as a third side P3. A planar shape of the protrusion PP may be determined by the second side P2 and the third side P3.

The stopper STP is disposed to cover the side of the optical sheet OPS, thereby restraining the movement of the optical sheet OPS. For example, as shown in (a) of FIG. 7, the stopper STP may be positioned corresponding to the first side P1 and the third side P3 of the optical sheet OPS. Namely, the stopper STP may be disposed to cover at least a portion of each of the first side P1 and the third side P3 of the optical sheet OPS. The stopper STP contacts the first side P1 of the optical sheet OPS and can restrict the movement of the optical sheet OPS in a left-right direction. The stopper STP contacts the third side P3 of the optical sheet OPS and can restrict the movement of the optical sheet OPS in an up-down movement.

As another example, as shown in (b) of FIG. 7, the stopper STP may be positioned corresponding to the second side P2 and the third side P3 of the optical sheet OPS. Namely, the stopper STP may be disposed to cover at least a portion of each of the second side P2 and the third side P3 of the optical sheet OPS. The stopper STP contacts the second side P2 of the optical sheet OPS and can restrict the movement of the optical sheet OPS in the left-right direction. The stopper STP contacts the third side P3 of the optical sheet OPS and can restrict the movement of the optical sheet OPS in the up-down movement. Although not shown, the stopper STP may be positioned corresponding to the first side P1, the second side P2, and the third side P3 of the optical sheet OPS. Namely, the stopper STP may be disposed to cover at least a portion of each of the first side P1, the second side P2, and the third side P3 of the optical sheet OPS.

As another example, as shown in (c) of FIG. 7, the stopper STP may be disposed to cover the entire side of the protrusion PP of the optical sheet OPS. Namely, the stopper STP may be positioned corresponding to the one second side P2 and the two third sides P3 connected to the one second side P2 determining a shape of the protrusion PP. Thus, self-rigidity of the stopper STP can be sufficiently secured by relatively increasing an area occupied by the stopper STP. Misalignment of the optical sheet OPS can be minimized since the position of the optical sheet OPS is effectively guided by the stopper STP.

The stopper STP has a predetermined height. The predetermined height (or thickness) may be equal to or greater than a sum of thicknesses of the optical sheets OPS. The height of the stopper STP may be set to be greater than the sum of the thicknesses of the optical sheets OPS, so that the optical sheets OPS are prevented from being detached. In other words, the stopper STP may protrude more than the optical sheets OPS in the frontward direction.

The stopper STP may be disposed on the same plane as the liquid crystal display panel supporter B1 in parallel with the liquid crystal display panel supporter B1. In other words, the stopper STP does not overlap the liquid crystal display panel supporter B1 in the vertical direction (or the thickness direction). The liquid crystal display panel supporter B1 has different lengths in the horizontal direction in a formation area of the stopper STP and in a non-formation area of the stopper STP.

At least a portion of the protrusion PP is positioned on the body BD and can be supported by the body BD. Namely, at least a portion of the protrusion PP may overlap the body BD in the vertical direction. In this case, the movement of the optical sheets OPS in the rearward direction can be restricted by the body BD.

The guide holder GH may further include a second boss BS2. The second boss BS2 is provided on a third surface of the body BD. The third surface of the body BD indicates a surface facing the side of the light guide plate LGP. The third surface of the body BD may be a surface opposite the first surface of the body BD. The second boss BS2 protrudes from the third surface of the body BD toward the light guide plate LGP. The second boss BS2 may be positioned between the light guide plate LGP and the horizontal portion HP of the cover bottom CB. The second boss BS2 is interposed between the light guide plate LGP and the horizontal portion HP of the cover bottom CB and can be firmly fixed. The light guide plate LGP, the guide holder GH, and the cover bottom CB are arranged as described above and thus can restrain and/or restrict the movement between them. The second boss BS2 may be formed to be relatively thin in consideration of an increase in the total thickness of the liquid crystal display.

An adhesive layer LSA is provided between the edge of the liquid crystal display panel PNL and the liquid crystal display panel supporter B1, between the edge of the liquid crystal display panel PNL and the protrusion PP, and between the edge of the liquid crystal display panel PNL and the first boss BS1. Hence, the adhesive layer LSA performs the fixing between the liquid crystal display panel PNL and the liquid crystal display panel supporter B1, the fixing between the liquid crystal display panel PNL and the protrusion PP, and the fixing between the liquid crystal display panel PNL and the first boss BS1. In other words, a front surface of the adhesive layer LSA may directly contact a back surface of the liquid crystal display panel PNL, and a back surface of the adhesive layer LSA may directly contact the liquid crystal display panel supporter B1, the protrusion PP, and an upper surface of the stopper STP. The adhesive layer LSA can perform a function of restricting and restraining a mutual movement of the liquid crystal display panel PNL, the guide panel GP, the optical sheets OPS, and the guide holder GH and a function of buffering an external force provided. Further, the adhesive layer LSA may include a light shielding material capable of preventing light from leaking to the edge of the liquid crystal display panel PNL, thereby serving as a light shielding member.

Embodiments of the disclosure can prevent or reduce change in the position of the optical sheets OPS and the light guide plate LGP through the guide holder GH when the optical sheets OPS and the light guide plate LGP expand and contract or move (or change in position) due to external factors including temperature change, moisture change, external impact, vibration, etc. Hence, embodiments of the disclosure can prevent the optical sheets OPS and the light guide plate LGP from being damaged by interference between the optical sheets OPS and the light guide plate LGP and other components, and can prevent the optical characteristics of the liquid crystal display from being reduced. As a result, embodiments of the disclosure can provide the liquid crystal display with the improved product stability and reliability. Further, embodiments of the disclosure can provide the thin profile liquid crystal display even while restraining and restricting the movement of the optical sheets OPS and the light guide plate LGP in an inner space provided in the cover bottom CB.

FIG. 8 illustrate various examples of disposing the stopper STP of the guide holder GH for restricting the movement of the optical sheet OPS. However, embodiments are not limited to the examples illustrated in FIG. 8.

Figure 9:
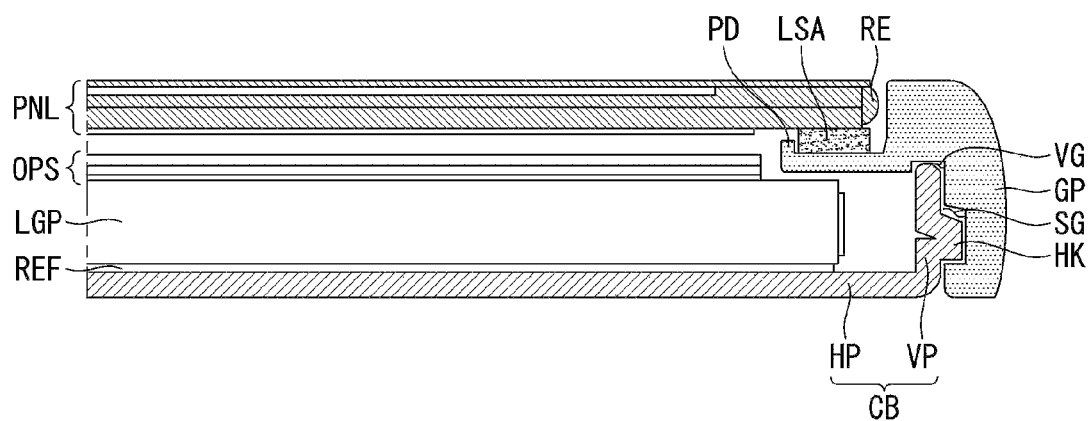
FIG. 9 is a cross-sectional view illustrating an example of fastening a cover bottom to a guide panel.

FIG. 9 is a cross-sectional view illustrating an example of fastening the cover bottom to the guide panel.

Referring to FIG. 9, in the embodiment of the disclosure, the cover bottom CB and the guide panel GP may be fastened to each other in a hook structure. An area where the hook structure is formed may be selected among areas where the guide holder GH is not disposed. In other words, the guide holder GH may be selectively disposed in areas where hook structure is not formed.

More specifically, the vertical portion VP of the cover bottom CB includes at least one hook HK protruding toward the extension B2 of the guide panel GP. The extension B2 of the guide panel GP includes at least one second groove SG into which the hook HK is inserted. The number of second grooves SG corresponds to the number of hooks HK.

The second groove SG may be an inner space formed by depressing a portion of an inner surface of the extension B2. The inner surface of the extension B2 indicates a surface of the extension B2 facing the vertical portion VP. The second groove SG is opened toward the hook HK of the vertical portion VP. The extension B2 has different thicknesses in a formation area of the second groove SG and in a non-formation area of the second groove SG.

The liquid crystal display according to the embodiment of the disclosure further includes a third groove VG formed at the liquid crystal display panel supporter B1 of the guide panel GP. In other words, the liquid crystal display panel supporter B1 of the guide panel GP includes the third groove VG into which the vertical portion VP of the cover bottom CB is inserted. The third groove VG may be an inner space formed by depressing a portion of an inner surface of the liquid crystal display panel supporter B1. The inner surface of the liquid crystal display panel supporter B1 indicates a surface of the liquid crystal display panel supporter B1 facing one end of the vertical portion VP. The third groove VG is opened in the rearward direction. The liquid crystal display panel supporter B1 has different thicknesses in a formation area of the third groove VG and in a non-formation area of the third groove VG. The third groove VG is extended in one direction so that one end of the vertical portion VP is inserted into the third groove VG.

The vertical portion VP extended from the horizontal portion HP of the cover bottom CB in the frontward direction is guided to the inner space provided by the third groove VG. The liquid crystal display according to the embodiment of the disclosure can fasten more strongly the guide panel GP to the cover bottom CB by further including the third groove VG into which the vertical portion VP of the cover bottom CB is inserted. Namely, even when an external force is applied, the guide panel GP can be firmly fastened to the cover bottom CB without being detached from the cover bottom CB. In addition, the liquid crystal display according to the embodiment of the disclosure can prevent the components accommodated in the inner space between the guide panel GP and the cover bottom CB from being detached by strongly fastening the guide panel GP to the cover bottom CB.

The liquid crystal display panel supporter B1 may further include a projection PD at its end, in order to prevent the adhesive layer LSA from being detached. The projection PD may have a shape protruding from the liquid crystal display panel supporter B1 in the frontward direction. The liquid crystal display panel supporter B1 and the projection PD may be formed as one body.

Embodiments of the disclosure do not need to cover the edges of the liquid crystal display panel PNL for the purpose of fixing the movement of the liquid crystal display panel PNL, and thus do not include a separate component such as a case top. Further, embodiments of the disclosure can remove or reduce a bezel area formed by the case top for blocking the edges of the liquid crystal display panel PNL. Thus, embodiments of the disclosure can provide light-weight and thin liquid crystal displays and achieve a narrow bezel. Further, embodiments of the disclosure do not need to perform an additional process for fastening the separate component such as the case top and thus can save process time and the process cost resulting from the additional process. In addition, embodiments of the disclosure can reduce process defects and remarkably improve the process yield.

When the case top is not provided, the liquid crystal display panel PNL can move in a lateral direction. Namely, when the case top is not provided, the fixing of the liquid crystal display panel PNL depends on an adhesive force of the adhesive layer. Therefore, the liquid crystal display panel PNL is not fixed in place due to change in an external environment and may be detached. When the liquid crystal display panel PNL is not fixed in place and moves, the liquid crystal display panel PNL may be damaged by interference between the liquid crystal display panel PNL and other components, and optical characteristics of the liquid crystal display may change. Hence, the reliability of the liquid crystal display may be reduced. Thus, in order to satisfy both the aesthetics and the reliability of the liquid crystal display, it is necessary to restrain and restrict the movement of the liquid crystal display panel PNL in the lateral direction while minimizing an area occupied by the bezel area.

To this end, the extension B2 according to the embodiment of the disclosure may be extended from one end of the liquid crystal display panel supporter B1 in the frontward direction. The extension B2 supports the side of the liquid crystal display panel PNL and can restrain and restrict the movement of the liquid crystal display panel PNL in the lateral direction. Hence, the embodiment of the disclosure can provide the liquid crystal display capable of satisfying both the aesthetic and the product reliability.

In order to achieve an extreme narrow bezel, the extension B2 of the guide panel GP may not protrude to the outside of the edge of the liquid crystal display panel PNL, or may protrude to the outside of the edge of the liquid crystal display panel PNL as small as possible when viewed from the front of the liquid crystal display.

The guide panel GP and the cover bottom CB according to the embodiment of the disclosure are configured as appearance components and thus can perform the same function as a rear cover or a middle frame. More specifically, the appearance components may be the extension B2 of the guide panel GP and the horizontal portion HP of the cover bottom CB.

Second Embodiment

Figure 10:
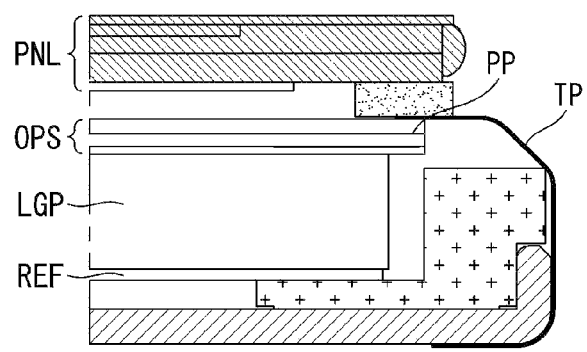
FIG. 10 illustrates a cross-sectional view and a perspective view of a liquid crystal display according to a second embodiment of the disclosure.
Figure 10:
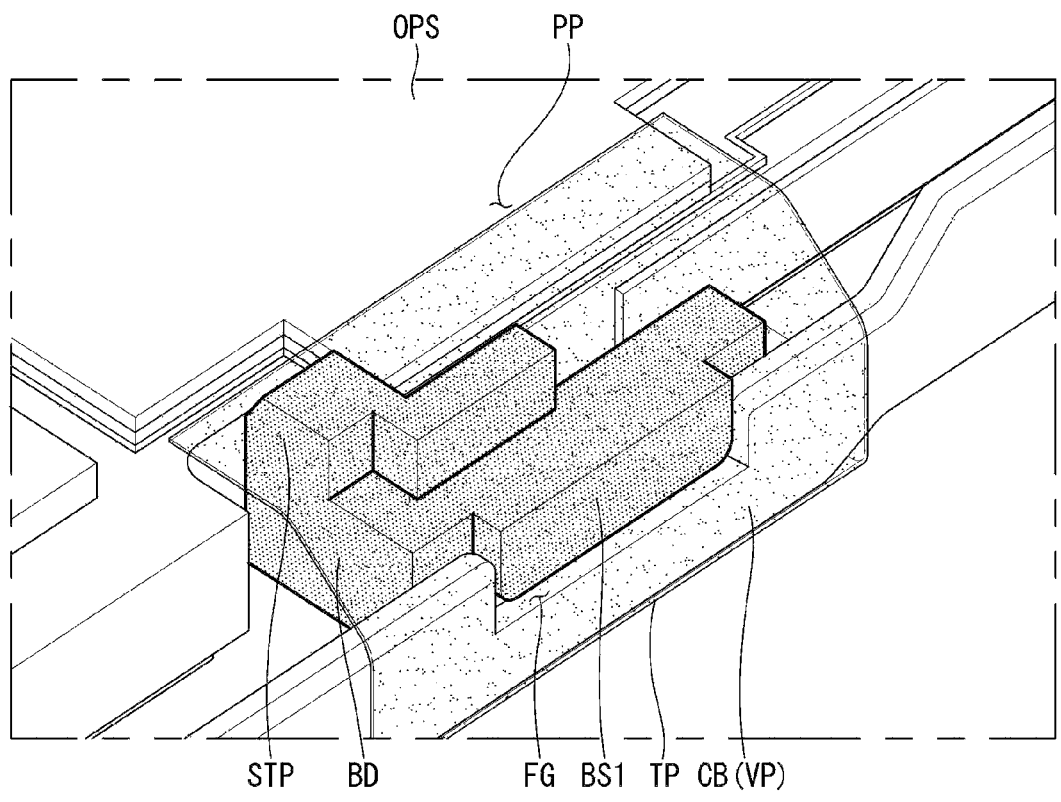

FIG. 10 illustrates a cross-sectional view and a perspective view of a liquid crystal display according to a second embodiment of the disclosure.

Referring to FIG. 10, a liquid crystal display according to a second embodiment of the disclosure may further include a tape TP, in order to minimize a movement of an optical sheet OPS during a manufacturing process. More specifically, before a guide panel GP is fastened during an assembling process of a liquid crystal module, the optical sheet OPS is not fixed in place and may be detached. In order to prevent this, the embodiment of the disclosure attaches the tape TP to a protrusion PP of the optical sheet OPS and an outer surface of a cover bottom CB, thereby fixing the optical sheet OPS. Namely, one end of the tape TP may be attached to an upper surface of the protrusion PP of the optical sheet OPS, and the other end of the tape TP may be attached to the outer surface of the cover bottom CB. Because the protrusion PP of the optical sheet OPS is not a component substantially performing an optical function, optical characteristics of the liquid crystal display are not reduced even when the tape TP is attached to the protrusion PP.

The tape TP may be further attached to at least one of a stopper STP and a first boss BS1 of a guide holder GH. In this instance, the optical sheet OPS can be firmly fixed in place during the manufacturing process.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device including a liquid crystal display panel, an optical sheet under the liquid crystal display panel, and a light guide plate under the optical sheet, comprising:
   a cover bottom including a horizontal portion covering a back surface of the light guide plate and a vertical portion that is extended from the horizontal portion and covers a side of the light guide plate;
   a guide panel including a liquid crystal display panel supporter, the liquid crystal display panel supporter that is disposed under the liquid crystal display panel and is positioned on a same plane as the optical sheet in parallel with the optical sheet, and an extension that is extended from the liquid crystal display panel supporter and covers the vertical portion of the cover bottom; and
   a guide holder disposed between the light guide plate and the vertical portion of the cover bottom,
   wherein the optical sheet includes a protrusion protruding toward the vertical portion of the cover bottom,
   wherein the guide holder includes a body, a stopper that protrudes from the body toward the liquid crystal display panel and covers a side of the protrusion of the optical sheet, and a first boss protruding from the body toward the vertical portion of the cover bottom,
   wherein the vertical portion of the cover bottom includes a first groove into which the first boss of the guide holder is inserted, and
   wherein the display device further comprises an adhesive layer disposed under an edge of the liquid crystal display panel and directly contacting the liquid crystal display panel supporter of the guide panel, the protrusion of the optical sheet, and the stopper of the guide holder.

2. The display device of claim 1, wherein the guide holder further includes a second boss protruding from the body of the guide holder and disposed between the light guide plate and the horizontal portion of the cover bottom.

3. The display device of claim 1, wherein the optical sheet includes a convex portion in which the protrusion is positioned, and a concave portion positioned adjacent to the convex portion,
   wherein the stopper of the guide holder covers at least one of a first side of the concave portion and a second side of the convex portion and a third side connecting the first side and the second side.

4. The display device of claim 1, wherein a thickness of the stopper of the guide holder is greater than a thickness of the optical sheet.

5. The display device of claim 1, wherein the first groove has a hole shape passing through an entire thickness of the vertical portion of the cover bottom, or a groove shape in which a thickness of the vertical portion of the cover bottom is partially depressed.

6. The display device of claim 1, wherein one side of the first groove is opened.

7. The display device of claim 1, wherein the vertical portion of the cover bottom includes a hook protruding toward the extension of the guide panel,
   wherein the extension of the guide panel includes a second groove formed as a depressed portion of an inner surface of the extension, and the hook is inserted into the second groove,
   wherein the liquid crystal display panel supporter of the guide panel includes a third groove formed as a depressed portion of an inner surface of the liquid crystal display panel supporter, and one end of the vertical portion of the cover bottom is inserted into the third groove.

8. The display device of claim 1, further comprising a tape including one end attached to an upper surface of the protrusion of the optical sheet and another end attached to an outer surface of the cover bottom.

9. A display device comprising:
   a liquid crystal display panel,
   an optical sheet under the liquid crystal display panel;
   a light guide plate under the optical sheet;
   a cover bottom covering a bottom surface of the light guide plate and at least a portion of a side surface of the light guide plate;
   a guide panel covering the side surface of the light guide plate and including a liquid crystal panel supporter to support at least an edge of the liquid crystal display panel;
   a guide holder including a body, a boss protruding from the body extending beneath a portion of the light guide plate, and a stopper protruding from the body toward the liquid crystal display panel and covering at least a portion of a side surface of the optical sheet to guide a position of the optical sheet, wherein the guide holder is at least partially enclosed by the cover bottom and the guide panel; and an adhesive layer attached to the liquid crystal display panel, the optical sheet, the guide panel, and the guide holder, wherein a top surface of the adhesive layer contacts a portion of a bottom surface of the liquid crystal display panel, and a bottom surface of the adhesive layer contacts at least a portion of top surfaces of the optical sheet, the liquid crystal panel supporter of the guide panel, and the stopper of the guide holder.

10. The display device of claim 9, wherein the optical sheet includes a protrusion and the optical sheet includes a convex portion in which the protrusion is positioned and a concave portion positioned adjacent to the convex portion.

11. The display device of claim 10, wherein a side of the concave portion is a first side, a side of the convex portion is a second side, a side connecting the first side and the second side is a third side, and the stopper of the guide holder covers a portion of the first side and a portion of the third side.

12. The display device of claim 10, wherein a side of the concave portion is a first side, a side of the convex portion is a second side, a side connecting the first side and the second side is a third side, and the stopper of the guide holder covers a portion of the second side and a portion of the third side.

13. The display device of claim 10, wherein the stopper of the guide holder covers an entire side of the protrusion including a side of the convex portion of the protrusion and two sides of the optical sheet adjacent to the side of the convex portion of the protrusion determining a shape of the protrusion.

14. The display device of claim 9, wherein the stopper of the guide holder is in same plane as and in parallel with the liquid crystal panel display supporter of the guide panel.

15. The display device of claim 9, wherein the cover bottom includes a hook, the guide panel includes a groove, and the cover bottom is fastened to the guide panel by inserting the hook of the cover bottom into the groove of the guide panel.

16. The display device of claim 9, wherein the liquid crystal display panel supporter of the guide panel includes a projection protruding from an end of the liquid crystal display panel supporter towards the liquid display panel.

17. The display device of claim 9, wherein the guide holder has another boss protruding from a body of the guide holder to fit in a groove of the cover bottom.

18. The display device of claim 17, wherein one side of the groove of the cover bottom is opened.

19. The display device of claim 9, further comprising a tape including one end attached to at least a portion of the optical sheet and another end attached to at least a portion of an outer surface of the cover bottom.

* * * * *